United States Patent [19]
Beyda et al.

[11] Patent Number: 6,005,573
[45] Date of Patent: Dec. 21, 1999

[54] METHOD AND SYSTEM FOR ESTABLISHING AREA BOUNDARIES IN COMPUTER APPLICATIONS

[75] Inventors: William Joseph Beyda, Cupertino; Gregory Noel, Menlo Park, both of Calif.

[73] Assignee: Siemens Information and Communication Networks, Inc., Boca Raton, Fla.

[21] Appl. No.: 08/873,779

[22] Filed: Jun. 12, 1997

[51] Int. Cl.$^6$ ........................................ G06F 3/14

[52] U.S. Cl. .................... 345/341; 345/340; 345/145; 707/503

[58] Field of Search ................... 345/341, 123, 345/973, 340, 145, 339; 707/503, 903, 905, 526

[56] References Cited

U.S. PATENT DOCUMENTS

| | | | |
|---|---|---|---|
| 5,075,673 | 12/1991 | Yanker | 345/123 X |
| 5,129,056 | 7/1992 | Eagen et al. | 345/341 |
| 5,337,405 | 8/1994 | Lindauer et al. | 707/503 |
| 5,371,846 | 12/1994 | Bates | 345/341 |
| 5,568,603 | 10/1996 | Chen et al. | 345/341 |
| 5,611,060 | 3/1997 | Belfiore et al. | 345/341 |
| 5,713,042 | 1/1998 | Takahashi | 345/145 X |
| 5,896,132 | 4/1999 | Berstis et al. | 345/341 |

*Primary Examiner*—Raymond J. Bayerl

[57] ABSTRACT

A method and system for limiting scrolling and the movement of a cursor in a computer application. The computer application is operated on a computer system that has a display device with a display area. The computer application has a work area that is larger than the display area of the display device and a cursor that indicates an active area. Upper and lower and/or left and right boundaries are established by a user. Movement of the cursor is limited to the area of the computer application that is defined by the user-established boundaries. Viewing of the work area of the computer application may also be limited to the area of the computer application that is defined by the user-established boundaries. In a preferred embodiment, the method and system is applied to a computer spreadsheet application.

20 Claims, 3 Drawing Sheets

METHOD AND SYSTEM FOR ESTABLISHING AREA BOUNDARIES IN COMPUTER APPLICATIONS

BACKGROUND OF THE INVENTION

The invention relates to the movement of a cursor on a computer screen. More particularly, the invention relates to limiting scrolling and the movement of a cursor on a computer screen.

DESCRIPTION OF THE RELATED ART

Cursor movement on a display screen of a computer system can be achieved by different techniques. Using the arrow keys on a keyboard and manipulating a mouse are the two most common ways to move a cursor on a display screen. To move a cursor using the arrow keys on a keyboard, the arrow key is pressed that corresponds to the desired direction of movement of the cursor on the screen. The particular key can be pressed multiple times to incrementally move the cursor multiple spaces, or the key can be held down to cause the cursor to move continuously until the key is released. To move the cursor with a typical mouse, the mouse is moved such that the corresponding mouse pointer is moved to the desired position. A button on the mouse is then pressed and the cursor is moved from its former position to a position at or near where the mouse pointer is located on the screen.

A typical computer application consists of a work area and ancillary function bars. The work area is the area that displays the user-entered information. For example, in a spreadsheet the work area consists of a matrix of cells arranged in columns and rows and in a word processor the work area consists of a "page" in which information is typed. The function bars typically surround the work area and provide the computer application support functions, such as editing functions and file management functions. Moving the cursor into and within the function bar areas is typically accomplished using the mouse and mouse pointer.

Some computer applications have a work area that is larger than the work area that is visible on a display screen. For example, in a computer application such as a spreadsheet, the columns and rows that make up the work area typically extend vertically and horizontally beyond the edges of the display screen and, as a result, large portions of the spreadsheet are out-of-display. That is, the columns of a spreadsheet are typically designated by capital letters (i.e., A, B, . . . ), and are located side-by-side starting from the left edge of the work area and extending to the right beyond the right edge of the display screen. Each individual column also extends lengthwise beyond the bottom edge of the display screen. Likewise, the rows of a spreadsheet, typically designated by numbers (i.e., 1, 2, 3, . . . ), are located on top of each other starting from the top edge of the work area and extending downward beyond the bottom edge of the display screen. Each individual row extends widthwise beyond the right end of the display screen. The columns and rows define a matrix of data cells. Each cell is identified by its column letter and row number designation. For example, a cell at the intersection of column "C" and row "4" is referred to as cell "C4." In a typical spreadsheet program, the active cell is identified by a darkened border. The darkened border is equivalent to a cursor location because the darkened border indicates the active position on the spreadsheet.

To move the cursor in order to access a cell that is presently within an out-of-display portion of the work area of a spreadsheet, an arrow key that corresponds to the desired direction of movement of the cursor may be pressed. The cursor then moves, for example, downward when the down arrow key is pressed. Once the cursor moves to the bottom edge of the work area of the displayed spreadsheet, the spreadsheet rows scroll upward, displaying previously out-of-display portions of the spreadsheet. If the user holds down the down arrow key continuously, the rows will continue to scroll upward. Some spreadsheet programs are designed so that the rate of the continuous scroll increases as the scroll key is held down. The continuous scroll rate can be so fast that the data entered onto the spreadsheet cannot be recognized by the user as the data passes by the display screen. The continuous scroll stops when the scroll key is released and the cursor is located at the last row that the cursor has entered.

Using a mouse to make out-of-display portions of the work area of a spreadsheet visible on the display screen and to move the cursor to the visible area typically utilizes scroll bars. Scroll bars are usually located horizontally on the bottom edge and vertically on the right edge of the functional area of the spreadsheet. The scroll bar on the right edge typically has an up arrow and a down arrow. Locating the mouse pointer on the up arrow or the down arrow will scroll the spreadsheet in the corresponding direction. The scroll bar on the bottom edge typically has a left arrow and a right arrow that effect scrolling in the left and right directions, respectively. To scroll, for example down the spreadsheet, the mouse pointer is located on top of the down arrow on the right side of the display screen and then a button on the mouse is pressed. The spreadsheet will scroll continuously if the mouse button is held down, and scrolling stops when the mouse button is released. Once the desired out-of-display portions of the spreadsheet are visible, to activate the cursor onto the desired cell, the mouse pointer is located over the desired cell and the mouse button is pushed, thereby relocating the cursor to the desired location.

As with the keystroke technique, the scroll rate in many computer programs increases as the mouse button is continuously held down with the mouse pointer on the down scroll arrow. The continuous scroll rate using a mouse can be so fast that data existing on the work area cannot be recognized by the user as the data scrolls by the display screen.

The continuous scroll rate, using the keystroke technique and the mouse scrolling technique, is typically set to allow distinct areas of a spreadsheet to be brought into the view of the display screen in a short period of time. While this is effective for its intended purpose, sometimes the scroll rate is so fast that the desired area of the spreadsheet is passed up during scrolling and time is wasted going back to the desired area. That is, when trying to scroll to a particular point in the work area where data has been entered on a spreadsheet, the user must pay close attention to the display screen to ensure that the entered data is not passed.

To facilitate easier viewing of titles, some spreadsheet programs have configuration functions that allow a user to block off a portion of the work area of a spreadsheet and keep the cursor from moving into the area once it is blocked. The title blocks can only be created such that the area above a vertical boundary is blocked or such that the area to the left of a horizontal boundary is blocked. The two blocking functions can also be used in conjunction with each other. The main purpose of the title blocking function is to freeze a block of titles relative to a series of entered data that corresponds to the titles. The title blocking does not allow title blocks to be established below or to the right of an area on the work area where data is to be entered.

What is needed is a way to control scrolling and the movement of a cursor on a computer display so that data can be accessed and manipulated easily.

SUMMARY OF THE INVENTION

The invention is a method and system for controlling cursor movement on a display device of a computer system. The method and system require operating a computer application that has a work area that is larger than the display area of the display device in the vertical and/or horizontal direction. The computer application has a cursor that indicates an active location within the computer application work area. Next, the method and system require identifying upper and lower boundaries and/or left and right boundaries within the work area of the computer application. Lastly, the method and system require restricting movement of said cursor to an abridged area that is bordered by the upper and lower and/or the left and right identified boundaries. The abridged area is an area that is less than the computer application work area.

The method and system may include the step of restricting the viewed portion of the computer application work area to that area that is bordered by the upper and lower boundaries and/or the left and right boundaries. The method and system may also include the step of establishing dynamic boundaries and the step of releasing the cursor to move beyond the established boundaries in response to a designated user command.

In the preferred embodiment, the method and system are applied to a computer spreadsheet application. In a computer spreadsheet application, vertical and horizontal boundaries consist of rows and columns, respectively.

BRIEF DESCRIPTION OF THE DRAWINGS

FIG. 4 is a depiction of a spreadsheet with a horizontal work area boundary set at column "T" in accordance with the invention.

FIG. 5 is a depiction of a spreadsheet with a vertical work area boundary set at row "8" in accordance with the invention.

FIG. 6 is a depiction of a spreadsheet with a horizontal work area boundary at column "J" and a vertical work area boundary at row "11" in accordance with the invention.

FIG. 7 is a depiction of a spreadsheet with a floating horizontal work area boundary and a floating vertical work area boundary in accordance with the invention.

FIG. 8 is a depiction of a spreadsheet with a floating horizontal work area boundary and a floating vertical work area boundary in accordance with the invention.

DETAILED DESCRIPTION

Figures 1, 2:
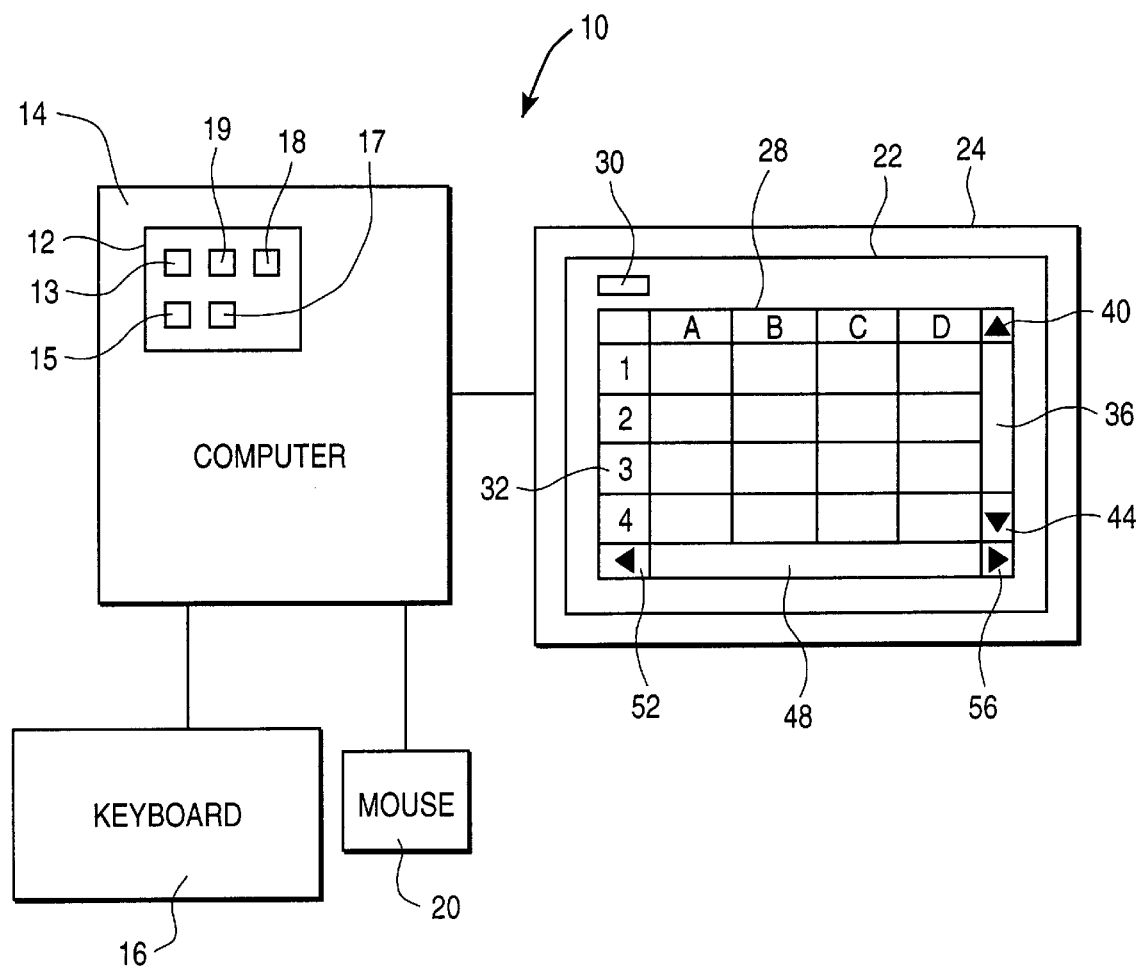
FIG. 1 is a depiction of a block diagram of the computer system and the computer application of the invention.
FIG. 2 is a depiction of the work area of a computer application.

In the preferred embodiment, the invention is used in a computer system such as the one depicted in FIG. 1. The computer system 10 consists of a computer 14, a keyboard 16, a mouse 20, and a display 24. The computer system is made up of conventional computer components and is able to run common computer applications 18, such as word processing and data management programs. In the preferred embodiment, the computer system runs a conventional spreadsheet program using a conventional operating system with a graphical user interface. The spreadsheet is depicted on the display area 22 of the display 24. The work area of the spreadsheet is made up of columns and rows and column and row headers.

FIG. 2 is a depiction of the work area 60 portion of the spreadsheet. For example purposes, the displayed portion of the spreadsheet consists of four rows and four columns, although the actual work area may contain more or fewer rows and/or columns. Referring back to FIG. 1, the columns 28 extend vertically downward on the display. The columns begin at a fixed or terminal left edge and are labeled A, B, C, and D. Additional columns continue on towards the right, essentially infinitely, beyond the edge of the display area. The rows 32 extend horizontally to the right on the display. The rows begin at a fixed or terminal top edge and are labeled 1, 2, 3, and 4. Additional rows continue on downwards essentially infinitely. At the intersection of each column and row, an individual cell is created.

The spreadsheet also has two scroll bars and various function buttons. A vertical scroll bar 36 is located on the right side of the display screen. The vertical scroll bar has an up arrow 40 and a down arrow 44. A horizontal scroll bar 48 is located on the bottom of the display screen and has a left arrow 52 and a right arrow 56. The function buttons are located above the work area. Most computer applications utilize multiple function buttons or pull-down menus, but only one function button 30 is shown for purposes of the description.

Figure 3:
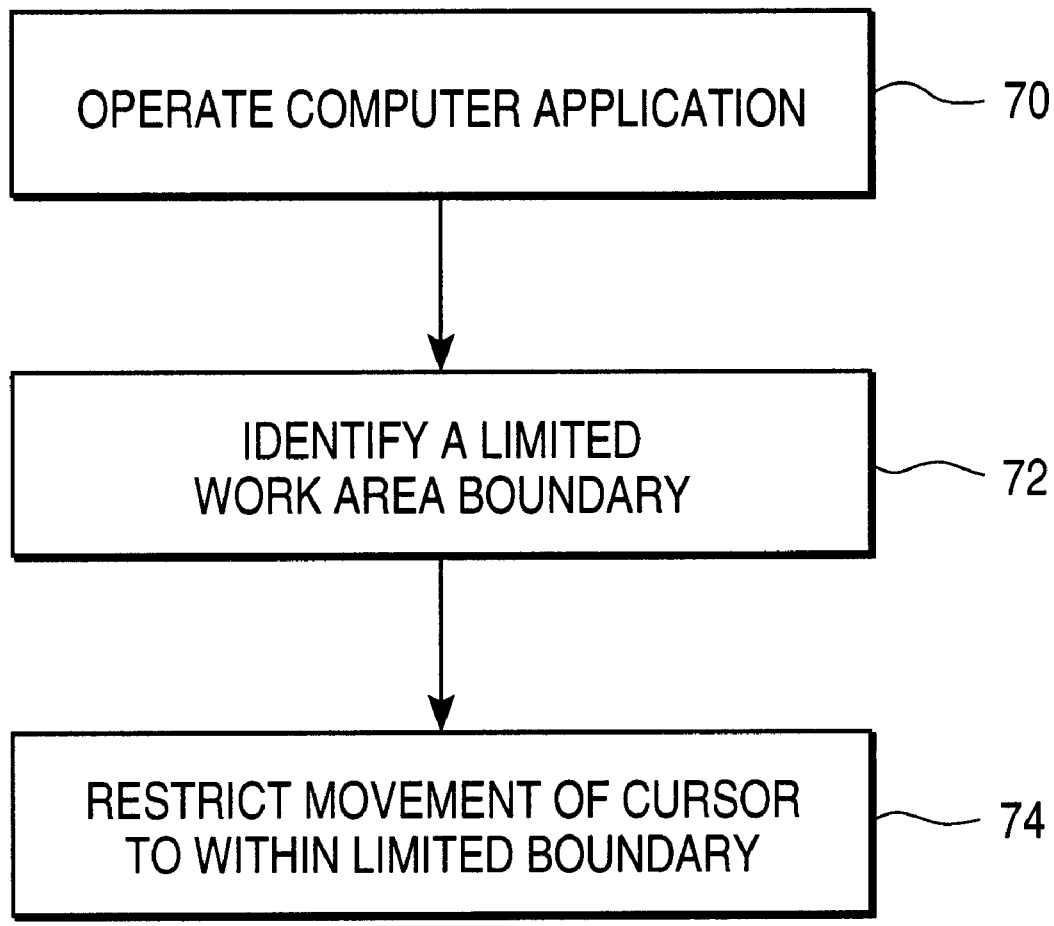
FIG. 3 is a block diagram of the cursor control method of the invention.

To implement the invention, referring to FIGS. 1 and 3, the spreadsheet program is operated 70 in the computer system 10 and displayed on the display 24. Next, a work area boundary is identified 72. The process of identifying a vertical work area boundary is started by initiating a configuration function in the spreadsheet. In the preferred embodiment, the configuration function is initiated by pressing the function button 30 with the mouse pointer. The function button activates a graphical menu that prompts the user to identify a vertical work area boundary. The user identifies a vertical work area boundary location by typing in the appropriate row number. In an alternative embodiment, the user can first use the mouse to select the row that is to be the vertical boundary. After the boundary is selected, the function button is pressed and the preselected row is automatically established as the vertical boundary.

Once the location of the vertical work area boundary is identified by the user, the computer system 10 establishes the vertical work area boundary in the spreadsheet using conventional software programming techniques. The program code that establishes the identified vertical work area boundary is located in a memory 12 that exists in the computer system. The vertical work area boundary program code located in the memory is depicted as element 13. The program code is integrated into the spreadsheet program code that is located in the memory 12.

The process of identifying a horizontal work area boundary is started by initiating a configuration function in the spreadsheet. In the preferred embodiment, the configuration function is initiated by pressing the same function button 30 as is used to identify the vertical work area boundary. The function button activates a graphical menu that prompts the user to identify a horizontal work area boundary. The user identifies a horizontal work area boundary location by typing in the appropriate column letter. In an alternative embodiment, the user can first use the mouse to select the column that is to be the horizontal boundary. After the boundary is selected, the function button is pressed and the preselected column is automatically established as the horizontal boundary.

Once the location of the horizontal work area boundary is identified by the user, the computer system 10 establishes the horizontal work area boundary in the spreadsheet using conventional software programming techniques. The program code that establishes the identified horizontal work area boundary is located in the memory 12. The horizontal work area boundary program code located in the memory is depicted as element 15.

As an alternate embodiment, the identification of the vertical and horizontal work area boundaries can be performed by integrated program code 17 located in the memory instead of the two pieces of program code identified as elements 13 and 15. The integrated code is developed using conventional software programming techniques.

A work area boundary is a boundary identified as either a particular row or a particular column beyond which the cursor will not be able to move and the work area will not scroll. For example, if column "T" was identified as the right side horizontal boundary limit, then the spreadsheet would only be able to be scrolled over to the "T" column and the cursor would only be able to be moved over to column "T." Referring to FIGS. 3 and 4, movement of the cursor to the right and scrolling to the right will be restricted 74 to no further than the right boundary limit, which is column "T" 78. Once the cursor is at column "T" or the work area is scrolled to column "T," the spreadsheet will not scroll further right if the right arrow key on the keyboard 16 is pressed or if the mouse pointer is activated on the right arrow 56 on the horizontal scroll bar. Although the cursor cannot be moved beyond the designated work area boundary and the work area cannot be scrolled any further to the right, the mouse pointer can be moved beyond the work area boundary and into the function button areas located around the work area.

Figures 4, 5, 6, 7, 8:
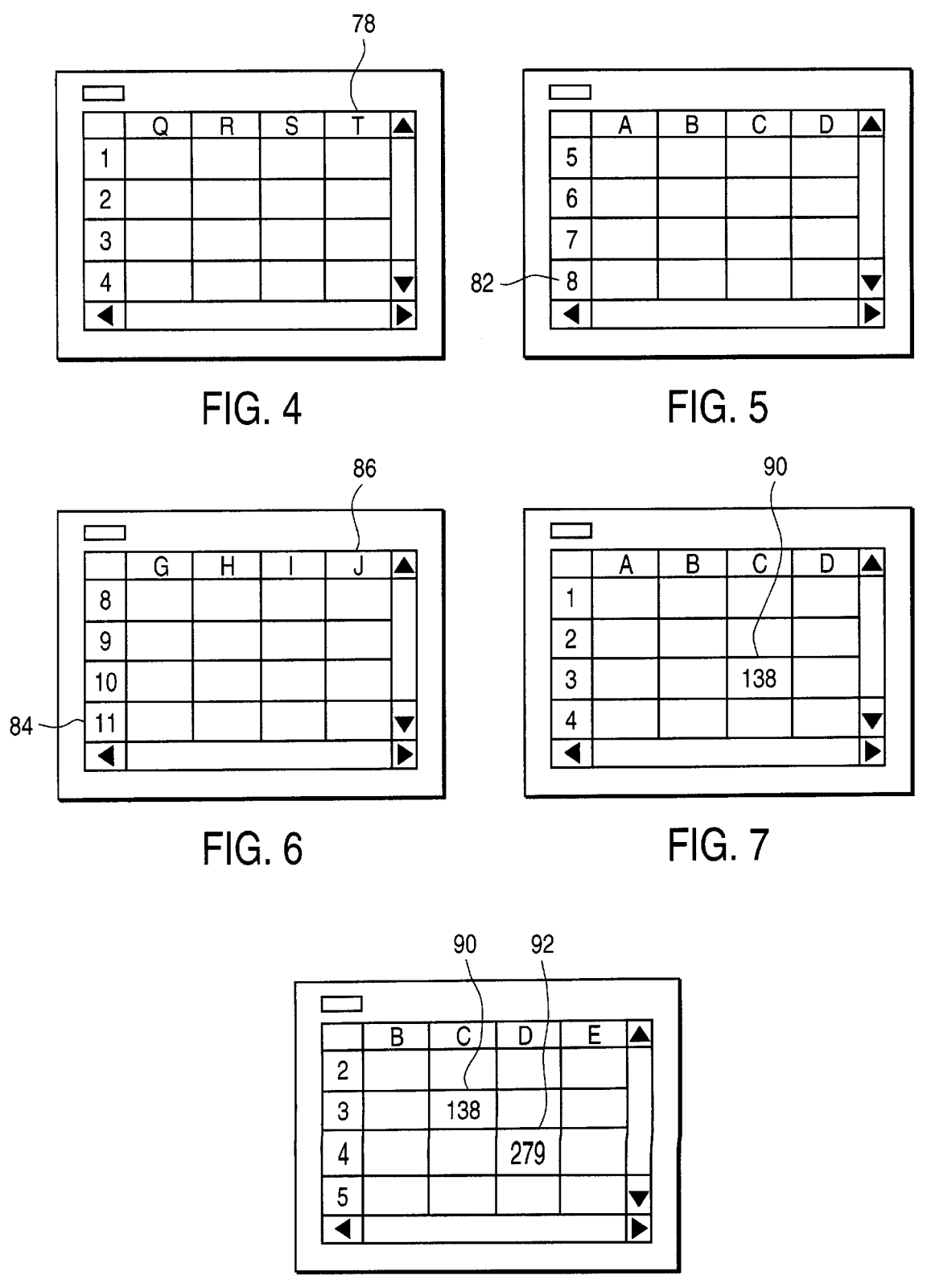

In another example, if row "8" is identified as the bottom vertical work area boundary, then the cursor will only be able to move down to row "8" and the spreadsheet will only be able to be scrolled down to row "8". Referring to FIG. 5, movement of the cursor downwards will be restricted 74 to no farther than row "8" 82, even if the down arrow key on the keyboard is pressed or the mouse pointer is activated on the down arrow 44 of the vertical scroll bar. Additionally, the work area will not scroll down past row "8."

In a third example, both vertical and horizontal work area boundaries can be identified to work together. Referring to FIG. 6, if row "11" 84 is set as the vertical boundary and column "J" 86 is set as the horizontal boundary, then the user can scroll down no farther than row "11" and no farther right than column "J" and the cursor will not move beyond row "11" and column "J."

Restriction of the movement of the cursor to within the area identified by the top terminal edge, the left terminal edge, and the lower vertical or right horizontal or both work area boundaries, is accomplished on the computer system 10 using conventional software programming techniques. The program code that restricts cursor movement is located in the memory 12 and is identified as 19. The program code that limits work area scrolling is located in memory 12 and is identified as 21. Both functions are integrated into the spreadsheet program code that is also stored in the memory 12.

In another embodiment of the invention, a work area boundary can be overridden in response to a user command. For example, if the user in FIG. 6 has a vertical boundary set at row "11" but the user wishes to move the cursor or scroll beyond row "11" without reconfiguring the spreadsheet work area boundaries, the user can initiate a command combination such as simultaneously pressing the "shift" and the down arrow key on the keyboard. The combination of keys releases the cursor to travel beyond the work area boundary. For the mouse technique, the user command can require pressing a mouse button twice in succession or pressing an alternate function mouse button. Whatever the user command, the cursor is released to travel beyond the work area boundary and the work area can be scrolled beyond the work area boundary. If the cursor is moved back to within the work area boundary, the user command will have to be initiated again to move the cursor beyond the work area boundary. The override ability can work equally well for a vertical work area boundary or a horizontal work area boundary.

In another embodiment of the invention, the work area boundaries can be established to perform in a floating or dynamic manner. In a floating or dynamic manner, the work area boundary changes depending on where data is input into the spreadsheet. For example, a work area boundary can be set to allow scrolling and cursor movement one row and one column beyond where any data is presently located on the spreadsheet. The boundary could then change each time new data is entered. Referring to FIG. 7, if data, for example the numeral "138" is entered into cell "C3," 90, then the cursor would not be able to be moved, or the work area scrolled, vertically below row "4" and horizontally to the right of column "D". Referring to FIG. 8, if data, for example the numeral "279" is then entered into cell "D4," 92, then the cursor would not be able to be moved vertically below row "5" and horizontally to the right of column "E". As a result, the horizontal and vertical work area boundaries float depending on where data is entered. According to user need, the row and column float distances can be set at any desired number of rows and/or columns beyond where data has been entered.

In other embodiments, the invention can be used in other computer applications. Some examples of other computer applications that can used include word processing programs, database programs, and computer drawing or drafting programs. When using these programs, scroll and cursor movement control are accomplished in generally the same manner as for a spreadsheet. One difference that can exist is that the units of measure may not be the same. For example, in a spreadsheet program the unit of measure is either a row or column, but in a graphics program the unit of measure could be a pixel. The program code required for these applications is generated using well known programming techniques.

In another embodiment of the invention, upper and lower boundaries can be set on, for example, a spreadsheet. In the embodiment, an upper boundary can be set at row "12" and a lower boundary can be set at row "50." With the upper and lower boundary set, the cursor can only be moved within rows 12 to 50. In the embodiment, a left and right boundary can also be set. The left boundary can be set at column "E" and the right boundary can be set at column "P." The cursor is then only able to move horizontally between columns E and P. If the upper and lower boundaries and the left and right boundaries are established to operate simultaneously, then in the above example, movement of the cursor will be limited to the block bordered by rows 12 and 50 and columns E and P.

In another embodiment of the invention, vertical and/or horizontal work area boundaries can be adjusted without the use of a function button or a graphical menu. To adjust an established boundary, the mouse pointer is placed on a portion of the work area boundary. The computer application recognizes the position of the mouse pointer over the boundary and prompts the user. Typically, the prompt is a change in the look of the mouse pointer. At this point, if the user wishes to change the established boundary, the user presses a mouse button and locks the mouse pointer onto the boundary. The boundary is then "dragged," using the mouse and mouse pointer, until the boundary is in the desired new location. Once in the new location, the mouse button is released, the new boundary is automatically established, and the user is free to continue working in the application.

What is claimed is:

1. A method of controlling cursor movement on a display device of a computer system, said display device having a display area, comprising the steps of:

operating a computer application that has a work area that is larger than said display area in at least one of a vertical direction and a horizontal direction, said computer application having a cursor to indicate an active location within said work area;

identifying one of either upper and lower boundaries or left and right boundaries within said work area of said computer application; and restricting movement of said cursor to an abridged area that is bordered by one of said upper and lower boundaries or said left and right boundaries, said abridged area being less than said work area.

2. The method of claim 1 further comprising the step of restricting said work area that can be viewed within said display area of said display device to said abridged area that is bordered by one of said upper and lower boundaries or said left and right boundaries.

3. The method of claim 1 wherein said step of identifying one of either said upper and lower boundaries or said left and right boundaries comprises identifying one of a dynamic lower boundary that extends a first distance below data that has been entered onto said work area of said computer application or a dynamic right boundary that extends a second distance to the right of data that has been entered onto said work area of said computer application.

4. The method of claim 1 further including a step of releasing said cursor to move beyond one of either said upper and lower boundaries or said left and right boundaries in response to a designated user command.

5. The method of claim 1 further including a step of operating a spreadsheet, and wherein said step of identifying one of either said upper and lower boundaries or said left and right boundaries is a step of identifying one of rows or columns, respectively, within said work area of said spreadsheet.

6. A computer system comprising:

a display device having a display area with a vertical dimension and a horizontal dimension;

a computer application, displayed on said display area, having a work area with a terminal top edge and a vertical length that is substantially larger than said vertical dimension of said display area and a terminal left edge and a horizontal width that is substantially larger than said horizontal dimension of said display device, said computer application having a cursor that indicates an active location on said work area;

first means for designating upper and lower boundaries for movement of said cursor in a vertical direction within said work area of said computer application;

second means for designating left and right boundaries for movement of said cursor in a horizontal direction within said work area of said computer application; and means, responsive to said first and second means, for capturing said cursor in a selected work area window that is a subset of said work area, said selected work area window being defined by said boundaries designated by said first and second means.

7. The computer system of claim 6 further comprising means, responsive to said first and second means, for displaying only said selected work area window on said display area of said display device.

8. The computer system of claim 7 wherein said means, responsive to said first and second means, for displaying only said selected work area window on said display area of said display device includes a means for displaying a portion of said work area that is beyond said upper and lower boundaries in response to a vertical release user command.

9. The computer system of claim 7 wherein said means, responsive to said first and second means, for displaying only said selected work area window on said display area of said display device includes a means for displaying a portion of said work area that is beyond said left and right boundaries in response to a horizontal release user command.

10. The computer system of claim 6 wherein said work area of said computer application is formed of first discrete data input units and said first means for designating upper and lower boundaries includes defining a floating vertical boundary that extends a preselected number of first discrete data input units beyond a first data input unit where data has been entered.

11. The computer system of claim 6 wherein said work area of said computer application is formed of second discrete data input units and said second means for designating left and right boundaries includes defining a floating horizontal boundary that extends a preselected number of second discrete data input units beyond a second data input unit where data has been entered.

12. The computer system of claim 6 wherein said means for capturing said cursor in a selected work window includes a means for allowing vertical movement of said cursor beyond said upper and lower boundaries in response to a vertical release user command.

13. The computer system of claim 6 wherein said means for capturing said cursor in a selected work window includes a means for allowing horizontal movement of said cursor beyond said left and right boundaries in response to a horizontal release user command.

14. The computer system of claim 6 wherein said computer application is a spreadsheet and wherein said vertical length of said computer application consists of distinct rows and said horizontal width of said computer application consists of distinct columns.

15. A method for controlling movement in a spreadsheet computer program comprising the steps of:

running said spreadsheet computer program on a computer that has a display device, said display device having a display screen on which said spreadsheet is viewed, said spreadsheet computer program having a work area that is larger than said display screen in at least one of a vertical direction and a horizontal direction, said work area consisting of discrete cells arranged in horizontal rows and vertical columns, said spreadsheet computer program having a cursor that is indicative of an active cell;

specifying one of either upper and lower boundaries or left and right boundaries within said work area of said spreadsheet computer program, said upper and lower boundaries being formed by a first horizontal row and a second horizontal row, said left and right boundaries being formed by a first vertical column and a second vertical column; and limiting movement of said cursor to within a work area window that is bordered by one of either said upper and lower boundaries or said left and right boundaries.

16. The method of claim 15 further comprising the step of limiting viewing of said work area on said display screen to said work area window that is created by one of either said upper and lower boundaries or said left and right boundaries.

17. The method of claim 15 wherein said step of specifying one of either said upper and lower boundaries or said left and right boundaries further includes specifying one of a floating upper boundary or a floating lower boundary, said floating upper boundary being at least one horizontal row above a cell in which data is entered on said work area window and said floating lower boundary being at least one horizontal row below said cell in which data is entered.

18. The method of claim 15 wherein said step of specifying one of either said upper and lower boundaries or said left and right boundaries further includes specifying one of a floating left boundary or a floating right boundary, said floating left boundary being at least one vertical column to the left of a cell in which data is entered on said work area window and said floating right boundary being at least one vertical column to the right of said cell in which data is entered.

19. The method of claim 15 wherein said step of limiting movement of said cursor further includes releasing said cursor to move beyond said work area window that is created by one of said upper and lower boundaries and said left and right boundaries in response to a cursor release user command.

20. The method of claim 15 wherein the step of limiting viewing of said work area on said display screen to said work area window that is created by one of said upper and lower boundaries and said left and right boundaries further includes allowing viewing of said work area that is beyond said work area window that is created by one of said upper and lower boundaries and said left and right boundaries in response to a view release user command.

* * * * *